United States Patent
Yano et al.

(10) Patent No.: US 6,984,460 B2
(45) Date of Patent: Jan. 10, 2006

(54) PHOSPHOR THIN FILM, MANUFACTURING METHOD OF THE SAME, AND ELECTROLUMINESCENCE PANEL

(75) Inventors: Yoshihiko Yano, Tokyo (JP); Tomoyuki Oike, Tokyo (JP); Masaki Takahashi, Tokyo (JP); Katsuto Nagano, Tokyo (JP)

(73) Assignee: TDK Corporation, Tokyo (JP)

( * ) Notice: Subject to any disclaimer, the term of this patent is extended or adjusted under 35 U.S.C. 154(b) by 15 days.

(21) Appl. No.: 10/394,212

(22) Filed: Mar. 24, 2003

(65) Prior Publication Data

US 2004/0048068 A1   Mar. 11, 2004

(30) Foreign Application Priority Data

Mar. 26, 2002   (JP) ..................................... 2002-087014

(51) Int. Cl.
*H05B 33/12* (2006.01)
*B32B 9/04* (2006.01)

(52) U.S. Cl. .................... 428/690; 428/411.1; 428/917; 252/301.16; 252/301.4 R; 313/503; 313/504; 313/506

(58) Field of Classification Search ................ 428/690, 428/917, 411.1; 313/503, 504, 506; 252/301.16, 252/301.4 R
See application file for complete search history.

(56) References Cited

U.S. PATENT DOCUMENTS

| | | | | |
|---|---|---|---|---|
| 4,216,408 A | * | 8/1980 | Verstegen et al. | ......... 313/468 |
| 4,233,623 A | * | 11/1980 | Pavliscak | .................... 348/797 |
| 4,751,427 A | | 6/1988 | Barrow et al. | ............. 313/503 |
| 5,820,669 A | * | 10/1998 | Cordaro | ...................... 106/635 |
| 6,075,504 A | * | 6/2000 | Stoller | ......................... 345/60 |
| 6,590,334 B1 | * | 7/2003 | Rasmussen et al. | ........ 313/496 |
| 6,614,173 B2 | * | 9/2003 | Yano et al. | ................. 313/503 |

FOREIGN PATENT DOCUMENTS

| | | |
|---|---|---|
| JP | 46-30802 | 9/1971 |
| JP | A 1-206594 | 8/1989 |
| JP | A 2-51891 | 2/1990 |
| JP | A 2-148688 | 6/1990 |
| JP | A5-65478 | 3/1993 |
| JP | A 10-270168 | 10/1998 |
| WO | WO 97/02721 | 1/1997 |
| WO | WO 98/33359 | 7/1998 |

OTHER PUBLICATIONS

Minami, "Oxide Phosphor Thin–Film Electroluminescent Devices," Display and Imaging, vol. 8, suppl., pp 83–93; Jul. 22, 1999.

Ohura et al., "Properties of Red–Color CaS:Eu thin film EL device," ITEJ Technical Report vol. 16 No. 76 pp. 7–11; Nov. 1992.

* cited by examiner

*Primary Examiner*—Rena Dye
*Assistant Examiner*—Camie S Thompson
(74) *Attorney, Agent, or Firm*—Oliff & Berridge, PLC

(57) ABSTRACT

The present invention aims at providing a phosphor thin film capable of realizing a light-emitting device attaining an excellent response, favorable color purity, and emission with a high luminance; and an EL panel including the same. The EL panel including the phosphor thin film of the present invention comprises a substrate, and a lower electrode, an insulating layer, an EL phosphor laminate thin film, and an upper electrode which are successively laminated on the substrate. In the EL phosphor laminate thin film, buffer thin films are formed on both sides of a phosphor thin film comprising a matrix material which is essentially constituted by magnesium gallate and doped with a rare-earth element or the like, and electron injection thin films are further formed on both sides thereof.

6 Claims, 6 Drawing Sheets

PHOSPHOR THIN FILM, MANUFACTURING METHOD OF THE SAME, AND ELECTROLUMINESCENCE PANEL

BACKGROUND OF THE INVENTION

1. Field of the Invention

The present invention relates to an EL (electroluminescence) panel, an EL phosphor thin film used therefor, and a method of making the same.

2. Related Background Art

Figure 5:
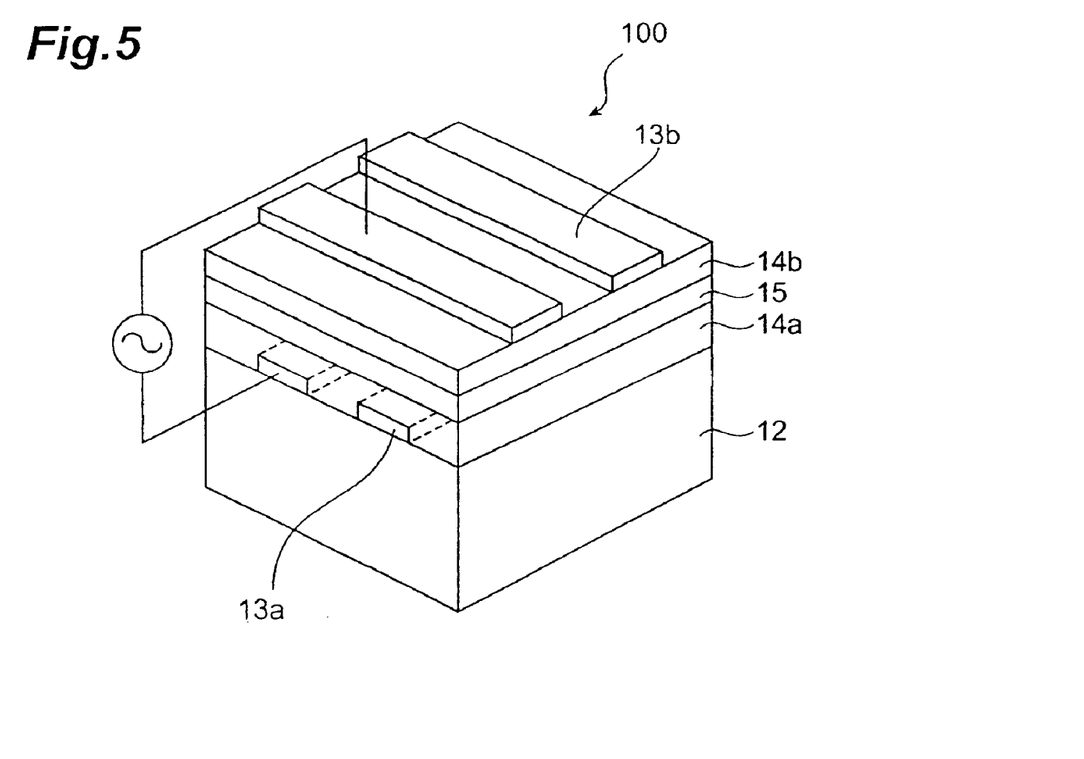
FIG. 5 is a perspective view schematically showing an example of conventional EL displays.

In recent years, research has actively been under way concerning thin-film EL devices as a small-size, or large-size, lightweight flat display panel. FIG. 5 is a perspective view showing an example of conventional EL displays. This EL panel 100, which is a monochromatic thin-film EL display comprising a phosphor thin film made of yellowish-orange-emitting manganese-doped zinc sulfide (ZnS:Mn) disposed between two thin-film insulating layers and having a so-called double insulating structure, has already been in actual use.

Specifically, a lower electrode 13a having a predetermined pattern is formed on a substrate 12 made of glass, whereas a dielectric thin film is formed as a lower insulating layer 14a on the lower electrode 13a. A light-emitting layer 15 made of a phosphor thin film and an upper insulating layer 14b are successively formed on the lower insulating layer 14a. On the upper insulating layer 14b, an upper electrode 13b is formed with a predetermined pattern so as to construct a matrix electrode in cooperation with the lower electrode 13a. For improving luminance, the light-emitting layer 15 is usually annealed at a temperature not higher than the strain point after the phosphor thin film is formed.

A structure using a substrate 12 made of ceramics and employing a thick-film dielectric layer as a lower insulating layer 14a has recently been proposed as well. Also proposed is a device structure in which a $BaTiO_3$ thin sheet, formed with an electrode on one side, exhibiting a high dielectric constant is used as both lower insulating layer 14a and substrate 12. Since such a structure uses ceramics such as alumina or $BaTiO_3$ as the substrate, the light-emitting layer 15 made of a phosphor thin film can be annealed at a higher temperature, whereby higher luminance can be attained.

Further, since a dielectric layer constituted by a thick film or thin sheet is used as the lower insulating layer 14a, it is stronger against dielectric breakdown than are those using a thin film for the lower insulating layer 14a, and thus is advantageous in that a highly reliable device is obtained.

The double insulating structure is not always necessary, and a thick-film or thin-sheet dielectric layer may be provided alone as an insulating layer.

Meanwhile, displays currently in use for personal computers, TVs, and other displaying purposes are required to show colors. Though thin-film EL displays using a zinc sulfide phosphor thin film are excellent in reliability and environmental resistance, they have not yet been considered suitable for color displays, since characteristics of EL phosphors emitting three primary colors of red, green, and blue are not sufficient.

Here, the following materials have been listed as candidates for materials for red, green, and blue, and their studies are underway. Examples of blue-emitting phosphors include SrS:Ce using SrS as a matrix material and Ce as a luminescent center, $SrGa_2S_4$:Ce, and ZnS:Tm. Examples of red-emitting phosphors include ZnS:Sm and CaS:Eu. Examples of green-emitting phosphors include ZnS:Tb and CaS:Ce.

These phosphor thin films emitting three primary colors of red, green, and blue have not yet been sufficient in terms of light-emitting luminance, efficiency, and color purity, so that color EL panels using them have still failed to come into actual use. Among them, red emission with a relatively favorable color purity has been attained by using CaS:Eu, and various improvements thereon have been proposed as disclosed in Japanese Patent Application Laid-Open Nos. HEI 1-206594 and HEI 2-148688, for example. However, they have not yet been sufficient as red-emitting materials for a full-color display in terms of light-emitting characteristics such as luminance and light-emitting efficiency.

On the other hand, CaS:Eu has a relatively long response time of several seconds to several tens of seconds as disclosed in Japanese Patent Application Laid-Open No. HEI 2-51891 and ITEJ Technical Report, Vol. 16., No. 76, pp. 7–11, thus failing to come into actual use as it is for displaying moving images requiring real-time responses to driving signals.

Under such circumstances, a ZnS:Mn phosphor thin film exhibiting high luminance and efficiency is used in general for red emission, and the red wavelength band is taken out from the EL spectrum of the phosphor thin film through a color filter, whereby red color necessary for a full-color panel is obtained. Using a color filter not only complicates the manufacturing process, but also yields an essential and important problem in that luminance decreases. When taking out red color by using a color filter, luminance tends to decrease by 10% to 20%, for example, thereby becoming insufficient for actual use.

As mentioned above, sulfide composition systems expanded from zinc sulfide (ZnS) to double and triple sulfides have widely been used so far as phosphors for EL devices. In general, however, sulfide type materials have the drawback of being susceptible to water and moisture. For example, $Al_2S_4$ reacts with water in the air, thereby changing into $Al_2O_3$ while generating $H_2S$. Therefore, when employing a phosphor made of a sulfide type material in an EL device, means for blocking water and protecting the device must be provided from the viewpoint of phosphor life. This may complicate the device structure.

Under these circumstances, the research and development for high-luminance EL devices using chemically stable oxide type phosphors in light-emitting layers has recently been gaining momentum. EL materials with various emission colors have been proposed, for example, in Display and Imaging, Vol. 8 suppl., pp. 83–93, Japanese National-Phase International Patent Application Laid-Open No. HEI 11-508628 (International Publication WO97/02721 pamphlet), and Japanese National-Phase International Patent Application Laid-Open No. 2001-512406 (International Publication WO98/33359 pamphlet).

SUMMARY OF THE INVENTION

However, the number of oxide type phosphors excellent in all of the luminance, light-emitting efficiency, and light-emitting purity is very small. In particular, red-emitting oxide phosphors with such high performances have not been reported yet.

Also, detailed studies about characteristics of EL devices using such oxide type phosphors conducted by the inventors have revealed that their application voltage for light emission (threshold voltage) is at 300 to 600 V and thus is higher than that for sulfide phosphor materials, whereas no sufficient abruptness is seen in a curve indicative of a luminance-voltage characteristic (L-V curve). Therefore, in an EL device using an oxide type phosphor, an excessive load is exerted on IC when matrix-driving an actual EL panel, so that the EL panel cannot substantially be driven by commercially available ICs at present.

In view of such circumstances, it is an object of the present invention to provide a phosphor thin film light-emitting device, excellent in response, having a favorable color purity while being able to emit light with a high luminance, which can realize a red-light-emitting device requiring no color filter in a full-color EL panel in particular; and an EL panel comprising the same.

For achieving the above-mentioned object, the inventors diligently studied various red-emitting EL phosphor materials and, as a result, have found that an EL device using a conventionally known CaS:Eu thin film fails to attain desirable light-emitting characteristics. Here, thus obtained thin film exhibited a light-emitting luminance of about 80 cd/m$^2$ when driven at 1 kHz. Its response time, i.e., time required for emission to be stabilized after voltage application, was found to be several seconds to several tens of seconds, thus making it necessary to improve the luminance and response. According to these findings, the inventors diligently synthesized various materials and evaluated their characteristics. In particular, the inventors searched for matrix materials from the viewpoint of causing rare-earth luminescent centers to emit light at a high luminance and, as a result, have achieved the present invention.

Namely, the present invention provides a phosphor thin film comprising a matrix material containing an oxide including Mg and Ga; and a luminescent center including at least one kind of element selected from rare-earth elements, Pb, Bi, and Cr.

Thus configured phosphor thin film has a matrix material mainly composed of Mg and Ga, thereby remarkably improving its luminance and response as compared with sulfide phosphors.

This seems to be a result of the fact that, when energy for light emission is given to such a matrix material, the energy moves (transitions) from oxygen to the luminescent center including at least one kind of element selected from rare-earth elements, Pb, Bi, and Cr by way of a metal charge migration triplet state, whereby the rare-earth luminescent center emits light at an unconventionally high luminance. This does not restrict operations, however.

When an oxide matrix material mainly composed of magnesium gallate is caused to contain an element to become a luminescent center as necessary, a phosphor thin film capable of emitting not only red but green or blue light can be realized. This is quite excellent in that highly pure red light can be emitted in particular.

It has also been found that the phosphor thin film of the present invention hardly generates "unevenness" on its light-emitting surface, thereby yielding a high in-plane uniformity in light-emitting intensity. This makes it difficult to generate dark spots, whereby life characteristics become excellent.

Though oxide phosphors are light-emitting members used as electron-beam-pumping or light-pumping phosphors for CRT and PDP (plasma display panels), oxide phosphor thin films are not easily crystallized and thus have been considered very hard to utilize as light-emitting layers for EL devices in general. By contrast, the phosphor thin film of the present invention can be crystallized by a low-temperature process at a temperature of 700° C. or lower, and thus is excellent in terms of usefulness when employed for EL devices.

Specifically, it is preferred that the matrix material be magnesium gallate, and that the luminescent center be a rare-earth element.

Preferably, the matrix material is an oxide containing an element A (at least one kind of element selected from Mg, Ca, Sr, Ba, and Zn, necessarily including Mg) and an element B (at least one kind of element selected from Ga, Al, B, and In, necessarily including Ga), satisfying the relationship represented by the following expression (1), more preferably by the following expression (2):

$$0.05 \leq M_B/M_A \leq 20 \quad (1)$$

$$0.8 \leq M_B/M_A \leq 1.9 \quad (2)$$

where $M_A$ is the number of atoms of element A in the matrix material, and $M_B$ is the number of atoms of element B in the matrix material.

The present invention provides a method of making a phosphor thin film for efficiency making the phosphor thin film of the present invention, the method comprising the step of forming a phosphor thin film comprising a matrix material containing an oxide including Mg and Ga and a luminescent center including at least one kind of element selected from rare-earth elements, Pb, Bi, and Cr by double vapor deposition using an evaporation source containing an oxide including Mg and the luminescent center and an evaporation source containing an oxide including Ga.

For forming an Mg—Ga—O thin film such as $MgGa_2O_4$ thin film containing Eu as its luminescent center, for example, MgO:Eu and $Ga_2O_3$ can be used as first and second evaporation sources, respectively. In general, Eu tends to be hard to disperse uniformly into a phosphor thin film since its doping amount to the material acting as its matrix is very small. By contrast, MgO can be utilized as a carrier when the first evaporation source is used as in the present invention, whereby a minute amount of Eu is uniformly dispersed in the phosphor thin film. As a result, a phosphor thin film emitting light at a high luminance can be manufactured reliably and stably.

Meanwhile, Table I in page 84 of Display and Imaging, Vol. 8 suppl., pp. 83–93 mentioned above lists $MgGa_2O_4$:Mn. Though this is a green-emitting phosphor, its luminance $L_{max}$ upon driving at 1 kHz listed in Table 1 is low, i.e., 14 cd/m$^2$, and thus is insufficient in practice. Also, its light-emitting efficiency $\eta_{max}$ is low, i.e., 0.001 lm/W.

By contrast, it has been verified that, when Eu is used as a luminescent center in the phosphor thin film of the present invention, a luminance of 1200 cd/m$^2$ or higher and a light-emitting efficiency of 0.44 lm/W or higher can be obtained as shown in examples which will be explained later.

The present invention provides an EL device comprising a lower buffer thin film, formed on a substrate, containing a sulfide; the phosphor thin film in accordance with the present invention formed on the lower buffer thin film; and an upper buffer thin film, formed on the phosphor thin film, containing a sulfide; each of the lower and upper buffer thin films having a thickness of 20 to 300 nm. This further lowers the light emission threshold voltage and further improves the luminance.

More specifically, it is preferred that the sulfide contained in the lower and upper buffer thin films is zinc sulfide.

More preferably, the EL device further comprises an upper electron injection thin film containing an oxide and/or nitride with a thickness of 5 to 150 nm on a side opposite from a side formed with the phosphor thin film in the upper buffer thin film. This further improves the luminance.

Specifically, it is preferred that the oxide contained in the upper electron injection thin film be aluminum oxide.

More preferably, the EL device further comprises a lower electron injection thin film containing an oxide and/or nitride with a thickness of 5 to 150 nm between the substrate and the lower buffer thin film. In this case, it will further be preferred if the oxide contained in the lower electron injection thin film is aluminum oxide.

The present invention provides an EL panel having a phosphor thin film comprising a matrix material containing an oxide including Mg and Ga; and a luminescent center including at least one kind of element selected from rare-earth elements, Pb, Bi, and Cr.

The present invention can also be defined as:

(a) A phosphor thin film comprising a matrix material containing an oxide including at least Mg and Ga, and a luminescent center including at least one kind of element selected from rare-earth elements, Pb, Bi, and Cr.

(b) A phosphor thin film according to (a), wherein the matrix material is magnesium gallate.

(c) A phosphor thin film according to (a) or (b), wherein the luminescent center is a rare-earth element.

(d) A phosphor thin film according to (a) or (b), wherein the matrix material is an oxide containing an element A (at least one kind of element selected from Mg, Ca, Sr, Ba, and Zn, necessarily including Mg) and an element B (at least one kind of element selected from Ga, Al, B, and In, necessarily including Ga), satisfying an atomic ratio of $0.05 \leq B/A \leq 20$ in the matrix material.

(e) A phosphor thin film according to (d), wherein $0.8 \leq B/A \leq 1.9$.

(f) A method of making the phosphor thin film according to any of (a) to (e), the method utilizing double vapor deposition using an evaporation source containing an oxide including at least Mg and a luminescent center, and an evaporation source containing an oxide including at least Ga.

(g) An EL panel having the phosphor thin film according to any of (a) to (e).

Preferably, the phosphor thin film of the present invention exists as a part of the following EL phosphor laminate thin films in an EL device.

(h) An EL phosphor laminate thin film, formed on a substrate, comprising, successively from the substrate side, a lower buffer thin film containing a sulfide, the phosphor thin film according to any of (a) to (e), and an upper buffer thin film containing a sulfide, each of the lower and upper buffer thin films having a thickness of 20 to 300 nm.

(i) An EL phosphor laminate thin film according to (h), wherein the sulfide contained in the lower and upper buffer thin films is zinc sulfide.

(j) An EL phosphor laminate thin film according to (h) or (i), further comprising an upper electron injection thin film containing an oxide and/or nitride with a thickness of 5 to 150 nm on a side opposite from a side formed with the phosphor thin film in the upper buffer thin film.

(k) An EL phosphor laminate thin film according to (j), wherein the oxide contained in the upper electron injection thin film is aluminum oxide.

(l) An EL phosphor laminate thin film according to (j) or (k), further comprising a lower electron injection thin film containing an oxide and/or nitride with a thickness of 5 to 150 nm disposed between the substrate and the lower buffer thin film.

(m) An EL phosphor laminate thin film according to (l), wherein the oxide contained in the lower electron injection thin film is aluminum oxide.

DESCRIPTION OF THE PREFERRED EMBODIMENTS

In the following, embodiments of the present invention will be explained in detail. In the explanation of drawings, constituents identical to each other will be referred to with numerals identical to each other without repeating their overlapping descriptions. For convenience of illustration, ratios of dimensions in the drawings are not restricted to those depicted, and do not always coincide with those explained. Positional relationships such as "upper/lower" and "left/right" will be based on those in the drawings unless otherwise specified.

First Embodiment

Figure 4:
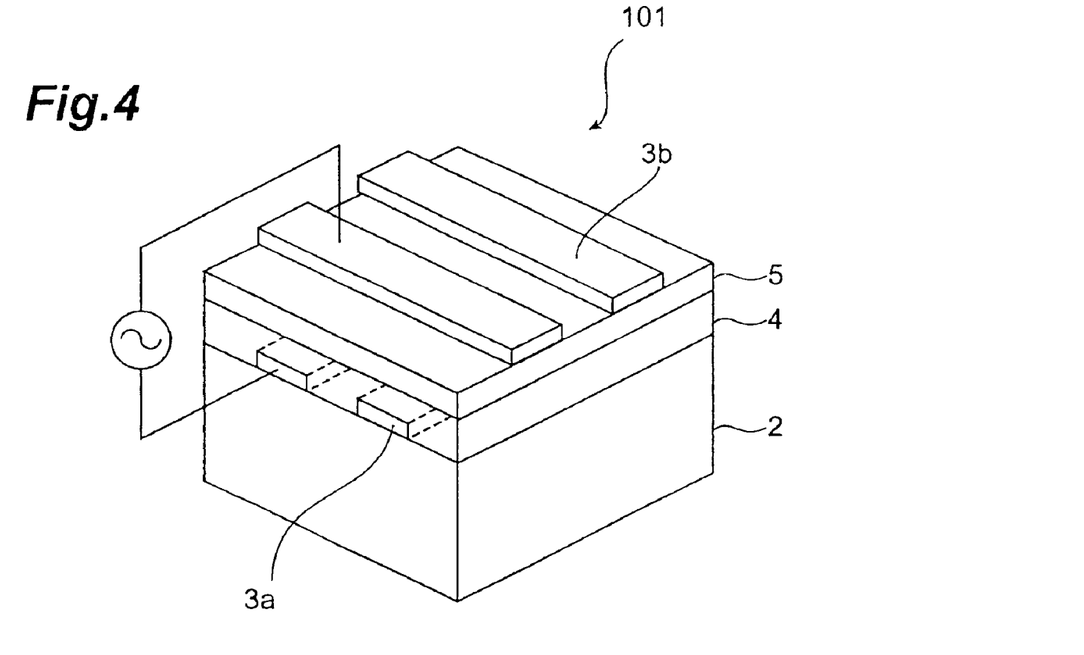
FIG. 4 is a perspective view showing a major part of a first embodiment of the EL panel in accordance with the present invention.

FIG. 4 is a perspective view showing a major part of a first embodiment of the EL panel in accordance with the present invention. This EL panel 101 comprises an EL device constituted by a substrate 2, and a lower electrode 3a, an insulating layer 4, a light-emitting layer 5, and an upper electrode 3b which are successively laminated on the substrate 2. An AC power supply is connected between the lower electrode 3a and the upper electrode 3b.

Substrate 2

Preferably, a material used as the substrate 2 has a heat-resistant temperature or melting point of at least 600° C., more preferably at least 700° C., further preferably at least 800° C., so as to endure forming temperatures of the individual EL device layers constituting the EL panel 101 and the temperature of annealing, which will be explained later, carried out when forming the EL device. When forming a light-emitting layer 5 made of the phosphor thin film of the present invention as will be explained later, annealing at a low temperature is possible, whereby a material having a relatively low heat-resistant temperature or melting point in conformity to the annealing temperature can be used as a material for the substrate 2.

The material is not restricted in particular as long as it can form an EL device by laminating a functional thin film such as the light-emitting layer 5 formed on the substrate 2 and can maintain a predetermined strength.

Specific examples include glass, ceramic substrates such as alumina ($Al_2O_3$), forsterite ($2MgO.SiO_2$), steatite ($MgO.SiO_2$), mullite ($3Al_2O_3.2SiO_2$), beryllia (BeO), aluminum nitride (AlN), silicon nitride ($Si_3N_4$), and silicon carbide (SiC+BeO), and heat-resistant glass substrates such as crystallized glass.

Among them, alumina and crystallized glass substrates are particularly preferable since their heat-resistant temperature is 1000° C. or higher. When thermal conductivity is required, it is preferred that beryllia, aluminum nitride, silicon carbide, and the like be used.

Additionally, silica, thermally oxidized silicon wafers, and metal substrates of titanium, stainless steel, Inconel, iron types, and the like can also be used. When using an electrically conductive substrate made of a metal or the like, a structure in which a thick film having an electrode therewithin is formed on the substrate 2 is preferred.

Electrodes 3a, 3b

The lower electrode 3a is usually formed within the insulating layer 4. The lower electrode 3a is exposed to a high temperature when heat-treating the light-emitting layer 5. When the insulating layer 4 is constituted by a thick film which will be explained later, the lower electrode 3a is also exposed to a high temperature at the time of forming the insulating layer 4. Therefore, it is preferred for the lower electrode 3a to be excellent in heat resistance. Specifically, it will be more preferable if the lower electrode 3a is a metal electrode.

Examples of the metal electrode include usually used ones such as those containing at least one kind of palladium, rhodium, iridium, rhenium, ruthenium, platinum, silver, tantalum, nickel, chromium, titanium, and the like as a main ingredient.

On the other hand, it is usually preferred that the upper electrode 3b be an electrode transparent to light in a predetermined light-emitting wavelength region, e.g., a transparent electrode made of ZnO, ITO, IZO, or the like, in order to take out emission from the side opposite from the substrate 2.

ITO usually contains $In_2O_3$ and SnO in a stoichiometric composition, though its O amount may deviate therefrom. The content (mixing ratio) of $SnO_2$ with respect to $In_2O_3$ in ITO is preferably 1% to 20% by mass, more preferably 5% to 12% by mass. The content (mixing ratio) of ZnO with respect to $In_2O_3$ in IZO is usually about 12% to 32% by mass. When a transparent substrate is used as the substrate 2 so as to take out emission from the substrate 2 side, the lower electrode 3a is formed as a transparent electrode.

The electrodes 3a, 3b may contain silicon as a main ingredient. The silicon electrode may be made of either polycrystalsilicon (p-Si) or amorphous silicon (a-Si), and may be monocrystal silicon if necessary.

For securing conductivity, the silicon electrode is usually doped with impurities. Any dopant can be used as the impurities as long as it can secure a desirable conductivity. Usual dopant substances used for silicon semiconductors in general can be employed. Specifically, B, P, As, Sb, and Al are preferred. The dopant concentration in the silicon electrode is preferably about 0.001 to 5 atomic %.

The method of forming the electrodes 3a, 3b is not restricted in particular. For example, it can appropriately be selected from known methods such as vapor deposition, sputtering, CVD, sol-gel method, and printing/baking method. When the lower electrode 3a is disposed so as to be incorporated within the insulating layer 4 made of a dielectric thick film in particular, it is preferred that the lower electrode 3a be made by the same method as with the dielectric thick film.

For efficiently applying an electric field to the light-emitting layer 5, the electrodes 3a, 3b preferably have a specific resistance of 1 $\Omega$·cm or less, more preferably 0.003 to 0.1 $\Omega$·cm. The electrodes 3a, 3b preferably have a film thickness of 50 to 2000 nm, more preferably about 100 to 1000 nm, though depending on their constituent materials.

Insulating Layer 4

An dielectric thick film is preferably used for the insulating layer 4, whereas a known dielectric thick film material can be used as its material. As the dielectric thick film material, those having a relatively high relative dielectric constant are preferable, and materials such as those of lead titanate type, lead niobate type, and barium titanate type, for example, are more preferable.

The specific resistance of the dielectric thick film is preferably at least $10^8$ $\Omega$·cm, particularly about $10^{10}$ to $10^{18}$ $\Omega$·cm. It is preferably made of a substance having a relatively high relative dielectric constant, whereas its relative dielectric constant $\epsilon$ is preferably about 100 to 10000. The film thickness of the dielectric thick film is preferably 5 to 50 $\mu$m, more preferably 10 to 30 $\mu$m.

Though the method of forming the insulating layer 4 made of such a dielectric thick film is not restricted in particular, a method which can relatively easily yield a film having a predetermined thickness is preferred, examples of which include sol-gel method and printing/baking method. In an example of procedure taken when using printing/baking method, a material having its granularity adjusted as necessary is initially mixed with a binder, so as to yield a paste exhibiting an appropriate viscosity. Subsequently, by screen printing, the paste is attached onto the substrate 2 formed with the lower electrode 3a, and then is dried, so as to yield a green sheet. Thereafter, the green sheet is baked at a predetermined temperature, so as to yield a thick film.

Light-Emitting Layer 5

The light-emitting layer 5 is constituted by the phosphor thin film of the present invention containing a matrix material and a luminescent center. The matrix material contains an oxide including Mg and Ga, and preferably comprises magnesium gallate as its basic composition.

The matrix material is an oxide containing elements A and B. Here, the element A is constituted by Mg, or by Mg and at least one kind of element selected from Ca, Sr, Ba, and Zn. The element B is constituted by Ga, or by Ga and at least one kind of element selected from Al, B, and In.

In this case, from the viewpoint of yielding a light-emitting layer 5 having a high luminance and further improved response, its chemical composition preferably satisfies the ratio (atomic ratio) between elements A and B represented by the following expression (1):

$$0.05 \leq M_B/M_A \leq 20, \quad (1)$$

more preferably the following expression (3):

$$0.1 \leq M_B/M_A \leq 4, \quad (3)$$

further preferably the following expression (4):

$$0.5 \leq M_B/M_A \leq 3 \quad (4)$$

where $M_A$ and $M_B$ are respective numbers of atoms of elements A and B in the matrix material.

A composition richer in element A than $AB_2O_4$ further improves the luminance of the light-emitting layer 5. Namely, the chemical composition particularly preferably satisfies the relationship represented by the following expression (2):

$$0.8 \leq M_B/M_A \leq 1.9, \quad (2)$$

most preferably the following expression (5):

$$1 \leq M_B/M_A \leq 1.6. \quad (5)$$

Assuming that the composition of the matrix material is represented by $A_xB_yO_z$, a stoichiometric composition is substantially established in the case of $xAO-(y/2)(B_2O_3)$, i.e., when $z=x+3y/2$. Here, "B" indicates "element B" not boron. Oxygen (O) may partly be substituted by sulfur (S).

For attaining emission with a high luminance, it will be preferable if the amount of oxygen included in the light-emitting layer 5 does not greatly deviate from the stoichiometric composition. As will be explained later, vapor deposition in an oxidizing atmosphere can reliably and stably yield a light-emitting layer 5 emitting light at a high luminance.

In the matrix material used for the light-emitting layer 5, Mg may partly be substituted by other alkaline earth elements and/or Zn in magnesium gallate, or Ga may partly be substituted by other elements in group 13 (group IIIA). When the ratio of substitution of these elements is enhanced in excess, however, the light-emitting layer 5 having a high luminance and favorable response tends to be harder to obtain. Therefore, each of the atomic (number) ratio of Mg in element A and the atomic (number) ratio of Ga in element B is preferably 0.2 to 1, more preferably 0.5 to 1, further preferably 1.

The luminescent center is at least one element selected from rare-earth elements, Pb, Bi, and Cr. Usable as the rare-earth element is at least one kind of element selected from Sc, Y, La, Ce, Pr, Nd, Gd, Tb, Ho, Er, Tm, Lu, Sm, Eu, Dy, and Yb.

Among them, Tm or Ce is preferably used for causing the light-emitting layer 5 to emit blue light. For emitting green light, Tb or Ho is preferable. For emitting red light, Cr, Eu, Pr, Sm, Yb, or Nd is preferable.

Here, two or more kinds of elements may be used as the luminescent center. When Eu is used as the luminescent center, for example, its response and light-emitting luminance can further be improved by doping it with Ce or the like.

Among such elements used for the luminescent center, rare-earth elements are particularly preferred in combination with the matrix material. Among them, at least one kind of element selected from Eu and Tb is particularly preferable. Specifically, the above-mentioned matrix material used in the present invention is quite excellent as the host for $Eu^{3+}$ ion, whereby thus combined composition enables red light emission with a high purity.

The luminescent center content in the light-emitting layer 5 is preferably 0.1 to 10 atomic % with respect to $M_A+M_B$.

For yielding the EL panel 101 comprising an EL device excellent in both light-emitting luminance and light-emitting efficiency, the film thickness of the light-emitting layer 5 is preferably 50 to 700 nm, more preferably 100 to 300 nm. If the film thickness exceeds 700 nm, the driving voltage may rise disadvantageously while the light-emitting layer 5 may tend to peel off easily. If the film thickness is less than 50 nm, on the other hand, the light-emitting efficiency may decrease.

For making the light-emitting layer 5 made of such a phosphor thin film of the present invention, the vapor deposition method explained in the following, for example, is preferably used. Here, taking the light-emitting layer 5 made of an Mg—Ga—O:Eu phosphor thin film as an example, a procedure of its manufacturing process will be explained.

First, as evaporation sources for forming the Mg—Ga—O:Eu film, magnesium oxide pellets doped with Eu as a luminescent center, and gallium oxide pellets are prepared. Subsequently, the substrate 2 formed with the lower electrode 3a by a known method and the evaporation source pellets are installed within a vacuum chamber (process chamber) having an oxygen gas introduced therein, and double EB (electron beam) vapor deposition is carried out. When this vapor deposition processing is performed for a predetermined period of time, the light-emitting layer 5 is formed by the deposited Mg—Ga—O:Eu film.

Here, the oxygen gas is introduced in order to prevent the amount of oxygen from coming short in the thin film to beformed. The oxygen gas reacts with evaporated substances, thereby generating oxides to make up for a shortage.

Using double vapor deposition as such is advantageous in making it easier for a minute amount of Eu to disperse into the light-emitting layer 5 uniformly. Such effects obtained by double vapor deposition occur not only when using a magnesium oxide evaporation source doped with Eu and a gallium oxide evaporation source, but also when using an evaporation source containing an oxide including Mg and another luminescent center and an evaporation source containing an oxide including Ga.

Eu acting as the luminescent center is added in the chemical state of metal, fluoride, oxide, or sulfide to a raw material. Since the Eu content in an evaporation source usually differs from that in a thin film formed by using the evaporation source, the Eu content in the evaporation source is adjusted so as to yield a desirable content in the thin film.

The temperature of the substrate 2 during vapor deposition is preferably at room temperature to 600° C., more preferably 150° C. to 300° C. If the substrate temperature exceeds 600° C., irregularities in the surface of the light-emitting layer 5 formed thereby may increase in excess, or pinholes may be more likely to occur in the thin film constituting the light-emitting layer 5, thereby increasing leak current in excess in the EL device. It may also tint the light-emitting layer 5 brown, for example.

The pressure within the vacuum chamber at the time of vapor deposition is preferably $1.33 \times 10^{-4}$ to $1.33 \times 10^{-1}$ Pa ($1 \times 10^{-6}$ to $1 \times 10^{-3}$ Torr). Here, a gas such as oxygen gas can be introduced, so as to adjust the pressure to $6.65 \times 10^{-3}$ to $6.65 \times 10^{-2}$ Pa ($5 \times 10^{-5}$ to $5 \times 10^{-4}$ Torr).

If the pressure exceeds $1.33 \times 10^{-4}$ Pa, E guns (electron guns) may operate unstably, thereby making it very difficult to control the composition of the light-emitting layer 5. Though depending on the capacity of a vacuum system (exhaust system connected to the vacuum chamber), the amount of introduction of gas such as oxygen gas is preferably 5 to 200 sccm, more preferably 10 to 30 sccm.

If necessary, the substrate 2 may be moved or rotated at the time of vapor deposition. When the substrate 2 is moved or rotated, the film composition becomes uniform, whereby fluctuations can be reduced in the film thickness distribution of the light-emitting layer 5.

When rotating the substrate 2 as such, the rotational speed is preferably at least 10 rpm, more preferably 10 to 50 rpm, about 10 to 30 rpm in particular. If the rotational speed exceeds 50 rpm, sealing may be broken depending on the vacuum chamber. If the rotational speed is lower than 10 rpm, fluctuations in the composition may tend to occur easily in the film thickness direction of the light-emitting layer 5, whereby characteristics of the light-emitting layer 5 formed might deteriorate disadvantageously.

Means for rotating the substrate 2 is not restricted in particular, and can be constituted by a known rotational mechanism using a power transmission mechanism/reducer mechanism combining a power source such as a motor or hydraulic rotational mechanism with a gear, belt, pulley, or the like.

Means for heating the evaporation sources and substrate 2 is not restricted in particular, and may be any means having a predetermined heat capacity, reactivity, and the like, examples of which include tantalum wire heaters, sheath heaters, and carbon heaters. The heating temperature caused by such heating means is preferably about 100° C. to about 1400° C., whereas the accuracy in temperature control is preferably ±1° C., more preferably ±0.5° C., at 1000° C.

Thus formed light-emitting layer 5 is preferably made of a highly crystalline phosphor thin film. The crystallinity of the light-emitting layer 5 can be evaluated by X-ray diffraction, for example. For enhancing the crystallinity, it will be preferable if the heating temperature of the substrate 2 is made as high as possible. It will also be effective if the phosphor thick film is annealed in vacuum, $N_2$, Ar, S vapor, $H_2S$, air, oxygen, or the like after forming.

In particular, it will be preferred if the thin film is formed by the above-mentioned double vapor deposition and then annealed in an oxidizing atmosphere, since the luminance of the light-emitting layer 5 can further be enhanced.

Here, the oxidizing atmosphere at the time of annealing is preferably air or an atmosphere having an oxygen concentration higher than that of air. Though it is usually preferable for the annealing temperature to be set within the range of 500° C. to 1000° C., within the range of 600° C. to 800° C. in particular, a sufficiently high luminance can be achieved in the light-emitting layer 5 constituted by the phosphor thin film of the present invention even when the annealing temperature is lower than 750° C., 700° C. or lower in particular.

The oxide phosphor thin film is not prone to crystallize easily as mentioned above, and thus has generally been considered very difficult to utilize as a light-emitting layer for an EL device. By contrast, the phosphor thin film can be crystallized in a process at a temperature of 700° C. or lower, and thus is quite excellent, thereby being able to restrain thermally adverse effects from being exerted on the device by suppressing the amount of heat input.

If the annealing temperature is too low, the crystallinity cannot be enhanced sufficiently, whereby the luminance improving effect may become insufficient. The annealing time is usually 1 to 60 minutes, preferably 5 to 30 minutes. If the annealing time is shorter than 1 minute, the above-mentioned effect caused by annealing may not be obtained sufficiently. If the annealing time exceeds 60 minutes, the effect achieved by annealing will tend to saturate, whereas constituents (such as electrodes and the substrate) other than the phosphor thin film may be damaged upon heating for a long period of time, which is unfavorable.

In thus configured EL panel 101, since the light-emitting layer 5 comprises a matrix material made of an oxide mainly composed of Mg and Ga and doped with a rare-earth element or the like as the luminescent center, applied energy moves from oxygen to the luminescent center by way of a metal charge migration triplet state, whereby luminance and response can drastically be improved over conventional sulfide phosphors.

Appropriately choosing the luminescent center element for doping such an oxide matrix material can realize a phosphor thin film capable of emitting not only red but also green or blue light, and can emit red light with a high purity in particular. Therefore, the EL panel 101 in accordance with the present invention and the light-emitting layer 5 constituted by the phosphor thin film of the present invention included therein can be employed as various EL panels, and are quite suitable as full-color panels for displays, multicolor panels, partially color panels for partially displaying three colors, and the like, for example.

Second Embodiment

Figure 3:
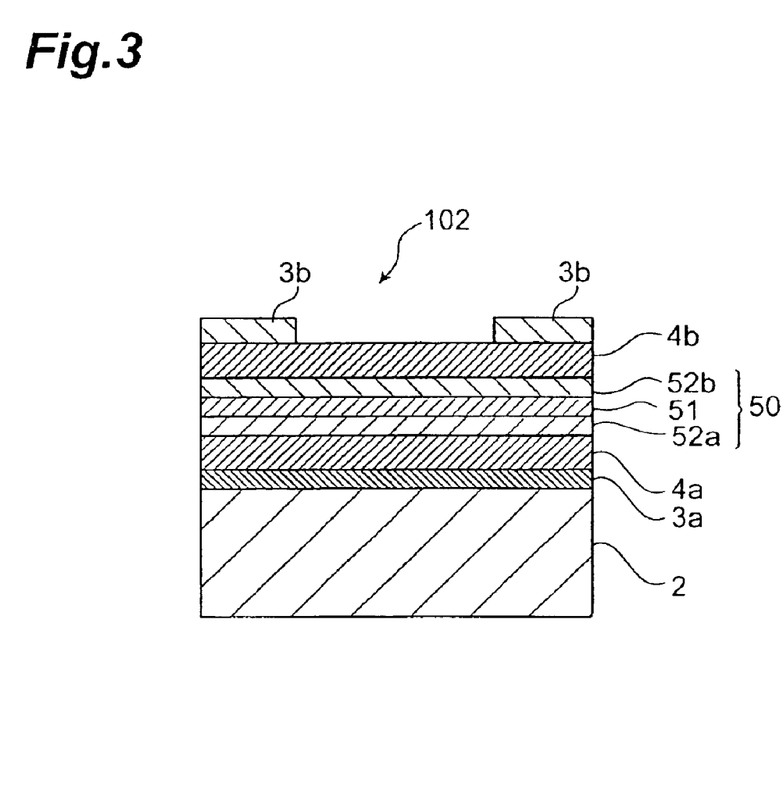
FIG. 3 is a sectional view showing a major part of a second embodiment of the EL panel in accordance with the present invention.

FIG. 3 is a sectional view showing a major part of a second embodiment of the EL panel in accordance with the present invention. This EL panel 102 comprises a substrate 2, and a lower electrode 3a, a lower insulating layer 4a, an EL phosphor laminate thin film 50, an upper insulating layer 4b, and an upper electrode 3b which are successively laminated on the substrate 2. The EL phosphor laminate thin film 50 comprises a lower buffer thin film 52a, a phosphor thin film 51, and an upper buffer thin film 52b which are successively laminated from the substrate 2 side.

Insulating Layers 4a, 4b

The lower insulating layer 4a can be obtained by the same material and forming method as with the insulating layer 4 constituting the EL panel 101 shown in FIG. 4.

On the other hand, a thin film insulating layer is preferably used as the upper insulating layer 4b. Examples of its material include silicon oxide ($SiO_2$), silicon nitride ($Si_3N_4$), tantalum oxide ($Ta_2O_5$), strontium titanate ($SrTiO_3$), yttrium oxide ($Y_2O_3$), barium titanate ($BaTiO_3$), lead titanate ($PbTiO_3$), PZT, zirconia ($ZrO_2$), silicon oxynitride (SiON), alumina ($Al_2O_3$), lead niobate, PMN-PT type material, and their multilayered or mixed thin films.

The method of forming the upper insulating layer 4b by these materials is not restricted in particular. For example, known methods such as vapor deposition, sputtering, and CVD can be used. The film thickness of the upper insulating layer 4b is preferably 50 to 1000 nm, about 100 to 500 nm in particular. The upper insulating layer 4b may be omitted.

Phosphor Thin Film 51

The phosphor thin film 51 can be obtained by the same material composition and forming method as with the light-emitting layer 5 constituting the EL panel 101 shown in FIG. 4.

Buffer Thin Films 52a, 52b

The lower buffer thin film 52a and upper buffer thin film 52b provided on both sides of the phosphor thin film 51 function as electron injection enhancing layers for further accelerating electrons injected into the EL phosphor laminate thin film 50 and injecting thus accelerated electrons into the phosphor thin film 51. Such electron injection enhancing effects of both buffer thin films 52a, 52b can lower the light emission threshold voltage of the oxide phosphor thin film, which has conventionally been 250 V or higher, to 180 V or less.

For fully exhibiting functions of the buffer thin films 52a, 52b, it is desirable that their thickness be regulated. Specifically, the thickness of each of the buffer thin films 52a, 52b is preferably 20 to 300 nm, more preferably 50 to 200 nm. A more preferable film thickness may depend on the kind of oxide phosphor material, and thus, more specifically, can appropriately be determined with in this preferable range according to the kind of oxide phosphor material.

If the thickness of buffer thin film 52a, 52b is less than 20 nm, the above-mentioned function as an electron injection enhancing layer may decrease remarkably. Specifically, the light emission threshold voltage may rise such that the voltage for driving the EL device to emit light may increase disadvantageously. On the other hand, since each of the buffer thin films 52a, 52b is an insulator, the capacitance of the EL phosphor laminate thin film 50 will effectively increase in excess if the thickness of each thin film exceeds 200 nm, whereby the light emission threshold voltage of the EL panel 102 may rise disadvantageously.

Each of the buffer thin films 52a, 52b is preferably a thin film containing a sulfide, a thin film made of a sulfide in particular. Examples of the sulfide include rare-earth sulfides such as yttrium sulfide ($Y_2S_3$), zinc sulfide (ZnS), magnesium sulfide (MgS), strontium sulfide (SrS), calcium sulfide (CaS), and barium sulfide (BaS). Among these sulfides, ZnS is particularly preferable from the viewpoint of its superior injection accelerating characteristic into the phosphor thin film 51.

For the buffer thin films 52a, 52b, the above-mentioned sulfides may be used one by one or in combinations of two or more kinds. The sulfides may form a mixed layer, or two or more thin films having respective compositions different from each other may be laminated together.

The method of forming such buffer thin films 52a, 52b is not restricted in particular. For example, known methods such as vapor deposition, sputtering, CVD, and sol-gel method can be used.

Third Embodiment

Figure 2:
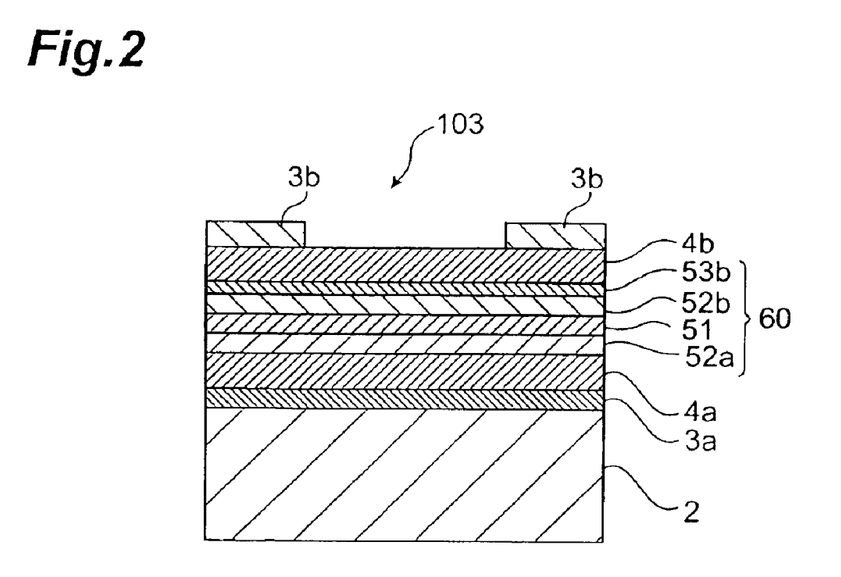
FIG. 2 is a sectional view showing a major part of a third embodiment of the EL panel in accordance with the present invention.

FIG. 2 is a sectional view showing a major part of a third embodiment of the EL panel in accordance with the present invention. This EL panel 103 has the same configuration as that of the EL panel 102 shown in FIG. 3 except that it comprises an EL phosphor laminate thin film 60 instead of the EL phosphor laminate thin film 50. The EL phosphor laminate thin film 60 has the same configuration as with the EL phosphor laminate thin film 50 except that an upper electron injection thin film 53b is further formed on the upper buffer thin film 52b.

The upper electron injection thin film 53b contains an oxide and/or nitride. The upper electron injection thin film 53b functions as an electron injection layer for the phosphor thin film 51, and can further improve the luminance when provided together with the buffer thin film 52b. Details of the upper electron injection thin film 53b will be explained in a fourth embodiment which will be explained in the following.

Fourth Embodiment

Figure 1:
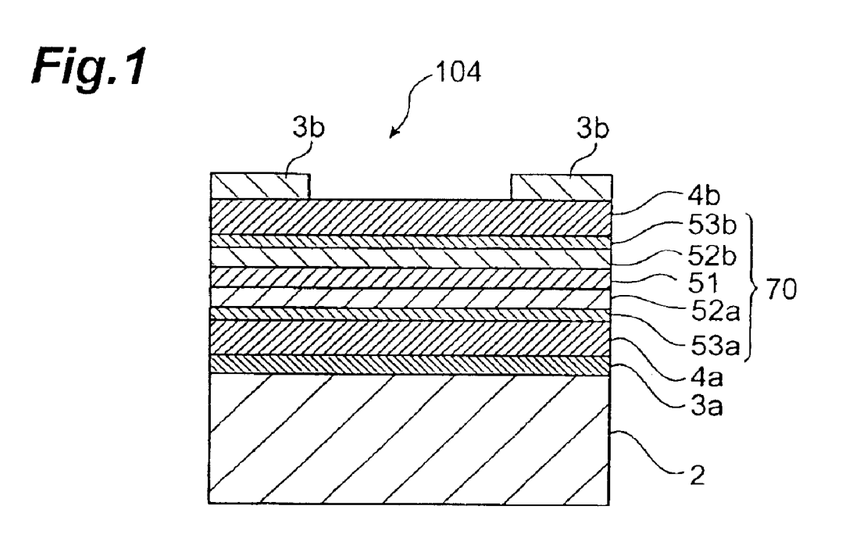
FIG. 1 is a sectional view showing a major part of a fourth embodiment of the EL panel in accordance with the present invention.

FIG. 1 is a sectional view showing a major part of the fourth embodiment of the EL panel in accordance with the present invention. This EL panel 104 has the same configuration as that of the EL panel 103 shown in FIG. 2 except that it comprises an EL phosphor laminate thin film 70 instead of the EL phosphor laminate thin film 60.

The EL phosphor laminate thin film 70 has the same configuration as with the EL phosphor laminate thin film 60 except that it has a lower electron injection thin film 53a on the substrate 2 side of the lower buffer thin film 52a. Namely, in the EL panel 104, the buffer thin films 52a, 52b are disposed on both sides of the phosphor thin film 51, whereas the electron injection thin films 53a, 53b are further provided on both sides thereof. This can yield a further higher luminance.

Electron Injection Thin Films 53a, 53b

For fully exhibiting functions of the electron injection thin films 53a, 53b, it is preferred that their thickness be regulated as with the buffer thin films 52a, 52b. The thickness of each of the electron injection thin films 53a, 53b is preferably 5 to 150 nm, more preferably 10 to 100 nm. The thickness of the lower electron injection thin film 53a is preferably 10 to 50 nm in particular, whereas the thickness of the upper electron injection thin film 53b is preferably 10 to 70 nm in particular.

Each of the electron injection thin films 53a, 53b is preferably a thin film containing an oxide and/or nitride, i.e., a thin film containing at least one kind of oxide, nitride, and oxynitride, more preferably a thin film made of an oxide, nitride, or oxynitride.

Examples of such an oxide, nitride, or oxynitride include rare-earth oxides such as yttrium oxide ($Y_2O_3$), silicon oxide ($SiO_2$), silicon nitride ($Si_3N_4$), tantalum oxide ($Ta_2O_5$), strontium titanate ($SrTiO_3$), barium titanate ($BaTiO_3$), zirconia ($ZrO_2$), hafnia ($HfO_2$), silicon oxynitride (SiON), alumina ($Al_2O_3$), aluminum nitride (AlN), and gallium nitride (GaN).

Among them, from the viewpoint of superior electron injection characteristics into the phosphor thin film 51, a rare-earth oxide such as yttrium oxide ($Y_2O_3$), alumina ($Al_2O_3$), zirconia ($ZrO_2$), or hafnia ($HfO_2$) is more preferable, among which alumina ($Al_2O_3$) is preferable in particular.

For the electron injection thin films 53a, 53b, the substances mentioned above may be used one by one or in combinations of two or more kinds. They may form a mixed layer, or two or more thin films having respective compositions different from each other may be laminated together.

In any case, it will be sufficient if the electron injection thin films 53a, 53b having the preferred thickness mentioned above exist as the topmost layers of the EL phosphor laminate thin films 60, 70 when annealing the EL phosphor laminate thin films 60, 70 in an oxidizing atmosphere. As a consequence, the electron injection thin film 53b existing as the topmost layer functions as an oxidization control layer for preventing the phosphor thin film 51 from oxidizing in excess during annealing in an oxidizing atmosphere.

The method of forming such electron injection thin films 53a, 53b is not restricted in particular. For example, known methods such as vapor deposition, sputtering, CVD, and sol-gel method can be used.

The above-mentioned buffer thin films 52a, 52b and electron injection thin films 53a, 53b have functions totally different from those of insulating layers in the conventional double insulating structure shown in FIG. 5, i.e., layers blocking electric charges. It has conventionally been unknown that the thin films 52a, 52b and electron injection thin films 53a, 53b having a thickness within the preferred ranges mentioned above are quite suitable as EL phosphor laminate thin films.

As with the EL panel 101, thus configured EL panels 102, 103, 104 can exhibit a high luminance and a high response. As mentioned above, each of the EL phosphor laminate thin films 50, 60, 70 included in the EL panels 102, 103, 104, respectively, has a structure in which a phosphor thin film of an oxide and a buffer thin film of a nitride are laminated together.

In general, an oxide thin film and a nitride thin film tend to have insufficient adhesion therebetween, so that peeling may occur at the interface between the thin films. Such peeling may be seen with a microscope. Usually, when continuously driven as an EL device, a point with no emission (dark spot) is observed, by which peeling can indirectly be seen. Namely, the dark spot seems to be generated when minute peeling occurs within a laminate thin film.

Since the phosphor thin film 51 constituting the EL phosphor laminate thin films 50, 60, 70 basically comprises magnesium gallate as a matrix material, its adhesion to the buffer thin films 52a, 52b, which are sulfide thin films, is favorable unlike other oxide thin films such as $Ga_2O_3$ thin films. This can sufficiently restrain problematic interfacial peeling from occurring, so as to prevent dark spots from occurring, and remarkably enhance its durability, so as to improve the reliability in continuous driving.

Though the present invention is explained in detail with reference to the embodiments in the foregoing, it should not be restricted to them and can be modified in various manners within the scope not deviating from the gist thereof. For example, each of the EL phosphor laminate thin films 50, 60, 70 may comprise a plurality of phosphor thin films 51 instead of one. Though the buffer thin films 52a, 52b may be provided alone without the electron injection thin films 53a, 53b, it is preferred in this case that a plurality of phosphor thin films and the buffer thin films 52a, 52b be laminated alternately whereas the buffer thin films 52a, 52b exist as the outermost layers of the EL phosphor laminate thin films 60, 70.

When the electron injection thin films 53a, 53b are further provided, it is preferred that a plurality of structure units each comprising a plurality of phosphor thin films held between two buffer thin films 52a, 52b are laminated so as to hold the electron injection thin films 53a, 53b, whereas the electron injection thin films 53a, 53b exist as the outermost layers of the EL phosphor laminate thin film 70.

Though it is not always necessary for the buffer thin films 52a, 52b and the electron injection thin films 53a, 53b to be in contact with each other, they are preferably disposed in contact with each other as shown in FIGS. 1 and 2 from the viewpoint of enhancing the electron injection efficiency.

Between adjacent layers among the insulating layers 4, 4a, 4b, the light-emitting layer 5 or EL phosphor laminate thin films 50, 60, 70, and the electrodes 3a, 3b, intermediate layers may be provided as necessary from the viewpoint of further improving the adhesion, alleviating the stress, or controlling reactions of layer materials. When using a thick film for the insulating layers 4, 4a, its flatness may be improved by surface polishing or covering it with a flattened layer.

EXAMPLES

In the following, the present invention will further be explained with reference to examples.

Example 1

First, a sheet to become a substrate 2 was prepared by a dielectric material (with a relative dielectric constant of 2000) of $BaTiO_3$—$PbTiO_3$ type; a paste, made of Pd, for forming a lower electrode 3a and an insulating layer 4 was screen-printed thereon, so as to yield a green sheet; and they were baked together. As the material for the insulating layer 4, the same $BaTiO_3$—$PbTiO_3$ type dielectric material (with a relative dielectric constant of 2000) as that of the substrate 2 was used.

Subsequently, the surface of the insulating layer 4 was polished and, for improving the flatness thereof, a $BaTiO_3$ film having a thickness of 400 nm was formed on thus polished surface by sputtering. Thereafter, annealing was carried out in air at 700° C., so as to form a thick film insulating layer (insulating layer 4) having a thickness of 30 $\mu$m.

Subsequently, the lower electron injection thin film 53a (50 nm), lower buffer thin film 52a (200 nm), phosphor thin film 51 (200 nm), an upper buffer thin film 52b (200 nm), and upper electron injection thin film 53b (50 nm) shown in FIG. 1 were successively laminated on the insulating layer 4. Here, the values in parentheses indicate thickness.

The electron injection thin films 53a, 53b were formed by vapor deposition using $Al_2O_3$ pellets as an evaporation source, whereas the buffer thin films 52a, 52b were formed by vapor deposition using ZnS pellets as an evaporation source.

The phosphor thin film 51 employed magnesium gallate as a matrix material while including Eu as its luminescent center, and was formed by double vapor deposition using two E guns (electron guns).

Specifically, at first, an EB source in which MgO pellets doped with 15 mol % of Eu were accommodated as an evaporation source and an EB source in which $Ga_2O_3$ pellets were accommodated as an evaporation source were disposed within a vacuum chamber having an oxygen gas introduced therein. Subsequently, the evaporation sources were heated at the same time, so as to form a phosphor thin film 51 made of Mg—Ga—O:Eu on the substrate 2 rotated while being heated at 150° C. Here, the evaporating rate of evaporation sources was adjusted such that the film forming rate of the phosphor thin film 51 became 1 nm/sec. The oxygen gas flow rate was 20 sccm.

The substrate 2 formed with the upper electron injection thin film 53b was annealed for 10 minutes in air at 700° C. for 10 minutes, so as to form the EL phosphor laminate thin film 70 of the present invention.

Here, as a monitor, an Mg—Ga—O:Eu thin film was formed on an Si substrate together with the phosphor thin film 51 within the vacuum chamber. Thereafter, the composition of this thin film was quantitatively determined by fluorescent X-ray analysis. As a result, its atomic ratio composition (in an arbitrary unit) was Mg:20.42, Ga:30.17, and Eu:0.82. Consequently, Ga/Mg=1.48, whereby it was seen that Eu became 1.62 mol % with respect to Mg+Ga. Before carrying out this example, it had been verified that the Mg—Ga—O:Eu thin films deposited on the Si substrate and substrate 2 had the same chemical composition.

Subsequently, on the EL phosphor laminate thin film 70, an upper electrode 3b made of an ITO transparent electrode having a film thickness of 200 nm was formed at a substrate temperature of 250° C. by RF magnetron sputtering using an ITO target, whereby an EL device applicable to an EL panel having a configuration equivalent to that of the EL panel 104 shown in FIG. 1 was obtained.

Example 2

An EL device applicable to an EL panel was obtained in the same manner as Example 1 except that neither the lower buffer thin film nor the upper buffer thin film was provided.

Comparative Example 1

An EL device using a CaS:Eu thin film as a light-emitting layer was prepared.

Characteristic Evaluation 1

Electrodes were drawn from the lower electrode 3a and upper electrode 3b of each of the EL devices obtained by Examples 1 and 2, and a bipolar electric field having a pulse width of 50 $\mu$m at 1 kHz was applied thereto, whereby light-emitting characteristics were measured.

As a result, with a favorable reproducibility, the EL device of Example 1 yielded red light emission of (0.66. 0.34) on a CIE 1931 chromaticity diagram with a luminance of 1200 cd/m² at an applied voltage of 300 V. Also, its light-emitting efficiency was found to be high, i.e., 0.44 lm/W. The EL device of Example 2 yielded a luminance of 50 cd/m² at an applied voltage of 300 V.

Figure 6:
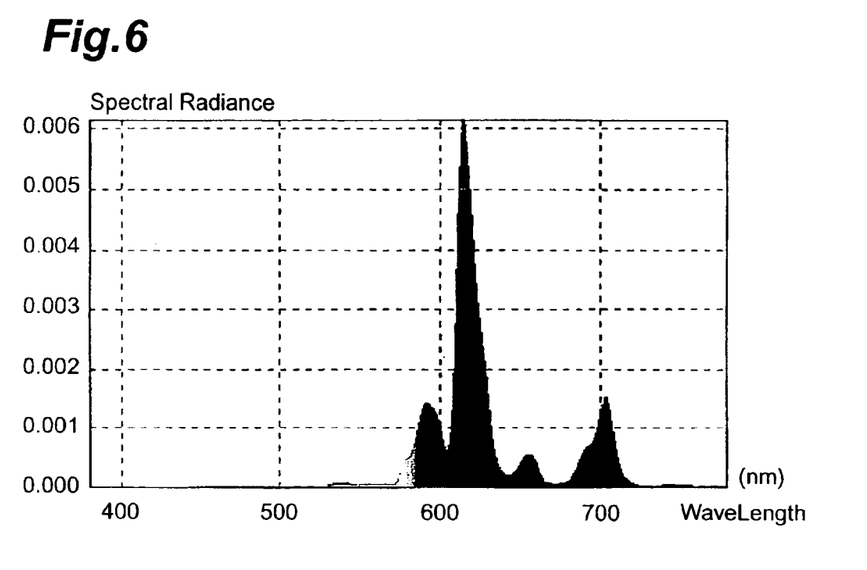
FIG. 6 is a graph showing an emission spectrum of the EL device obtained by Example 1.
Figure 7:
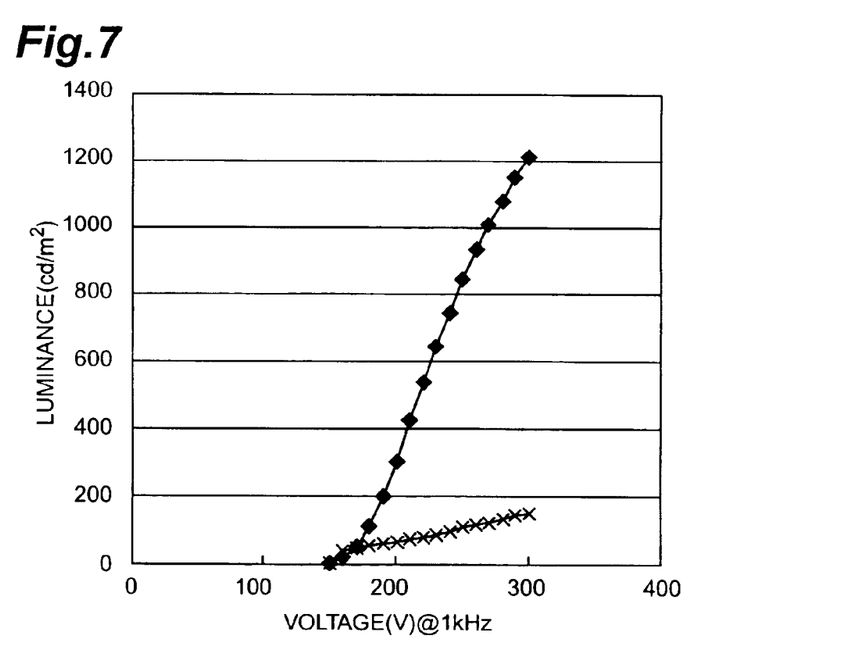
FIG. 7 is a graph showing L-V characteristics of EL devices obtained by Example 1 and Comparative Example 1.

For each of the EL devices of Example 1 and Comparative Example 1, emission spectrum and luminance (L) vs. applied voltage (V) characteristic were measured. FIG. 6 is a graph showing the emission spectrum of the EL device obtained by Example 1. FIG. 7 is a graph showing L-V characteristics of the EL devices obtained by Example 1 and Comparative Example 1. In FIG. 7, plotted black diamonds indicate results of Example 1, whereas plotted crosses indicate results of Comparative Example 1. Curves connecting similar plotted points illustrate respective reference lines. The L-V characteristics shown in FIG. 7 have proved that EL devices using the phosphor thin film in accordance with the present invention can attain a luminance higher than that conventionally obtained.

When the EL devices of Example 1 and Comparative Example 1 were evaluated in terms of response, the EL device of Comparative Example 1 having a CaS:Eu thin film exhibited a response of 3 seconds, whereas the EL device of Example 1 in accordance with the present invention exhibited a response of 10 msec or shorter under the same condition. This has verified that the phosphor thin film of the present invention can remarkably improve its response over conventional ones.

It was also seen that the EL devices of Examples 1 and 2 yielded light emission threshold voltages of 150 V and 240 V, respectively, thus being able to achieve a greater drop in light emission threshold voltage than conventional EL devices using oxide phosphors. From this fact, it can be understood that, when a full-color panel is constructed by using the phosphor thin film of the present invention, its driving voltage and driving power can be reduced. Thus, it has been verified that the phosphor thin film in accordance with the present invention and the EL device and EL panel using the same are quite useful.

Also, a comparison between Examples 1 and 2 has verified effects of the lower and upper buffer thin films.

Example 3

EL devices were prepared in the same manner as Example 1 except that the Ga/Mg and Eu doping amount in the Mg—Ga—O:Eu phosphor thin film were changed variously. These phosphor thin films having different compositions were collectively referred to as Example 3.

Characteristic Evaluation 2

Figure 8:
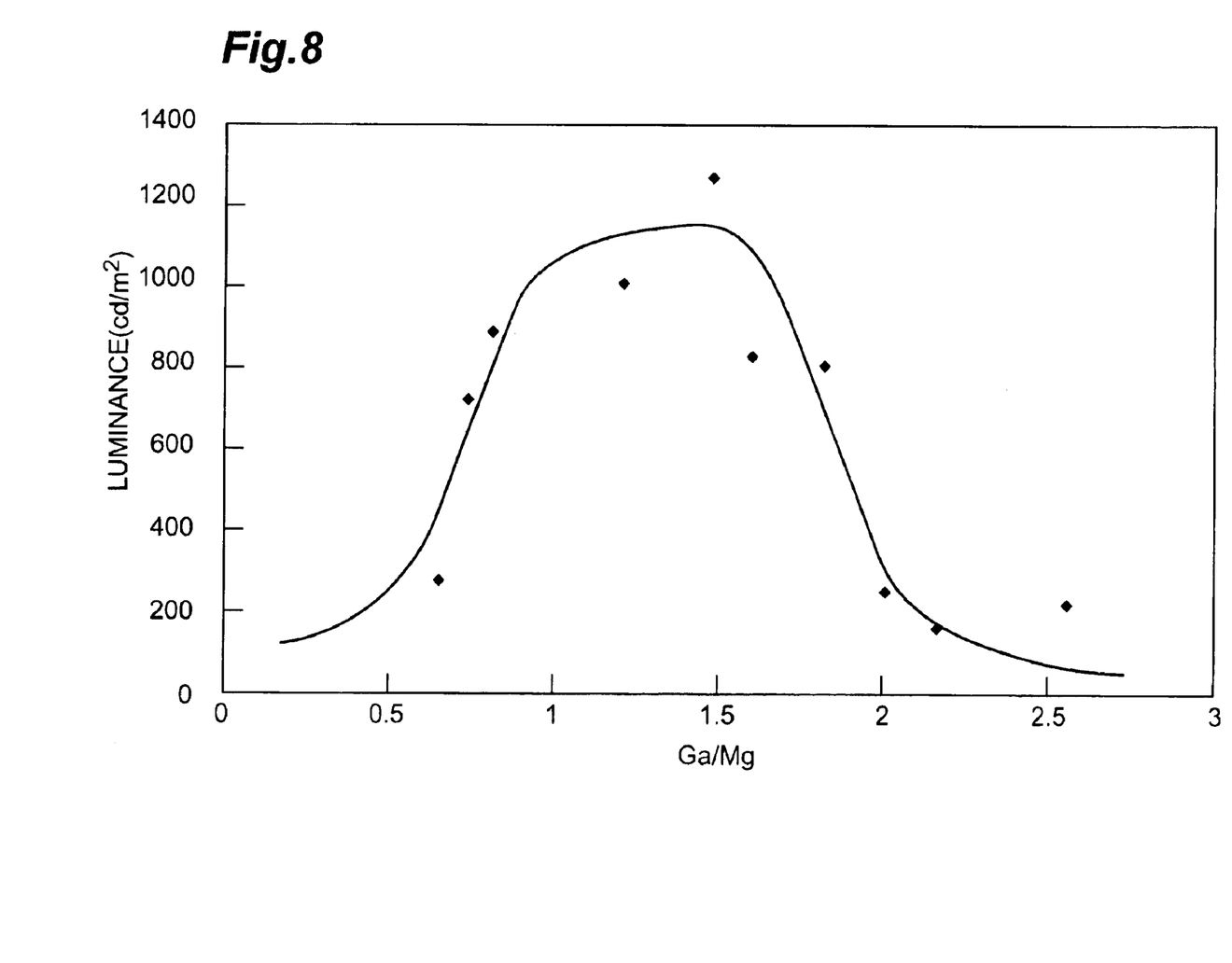
FIG. 8 is a graph showing the relationship between Ga/Mg and luminance in the phosphor thin films of EL devices obtained by Example 3.
Figure 9:
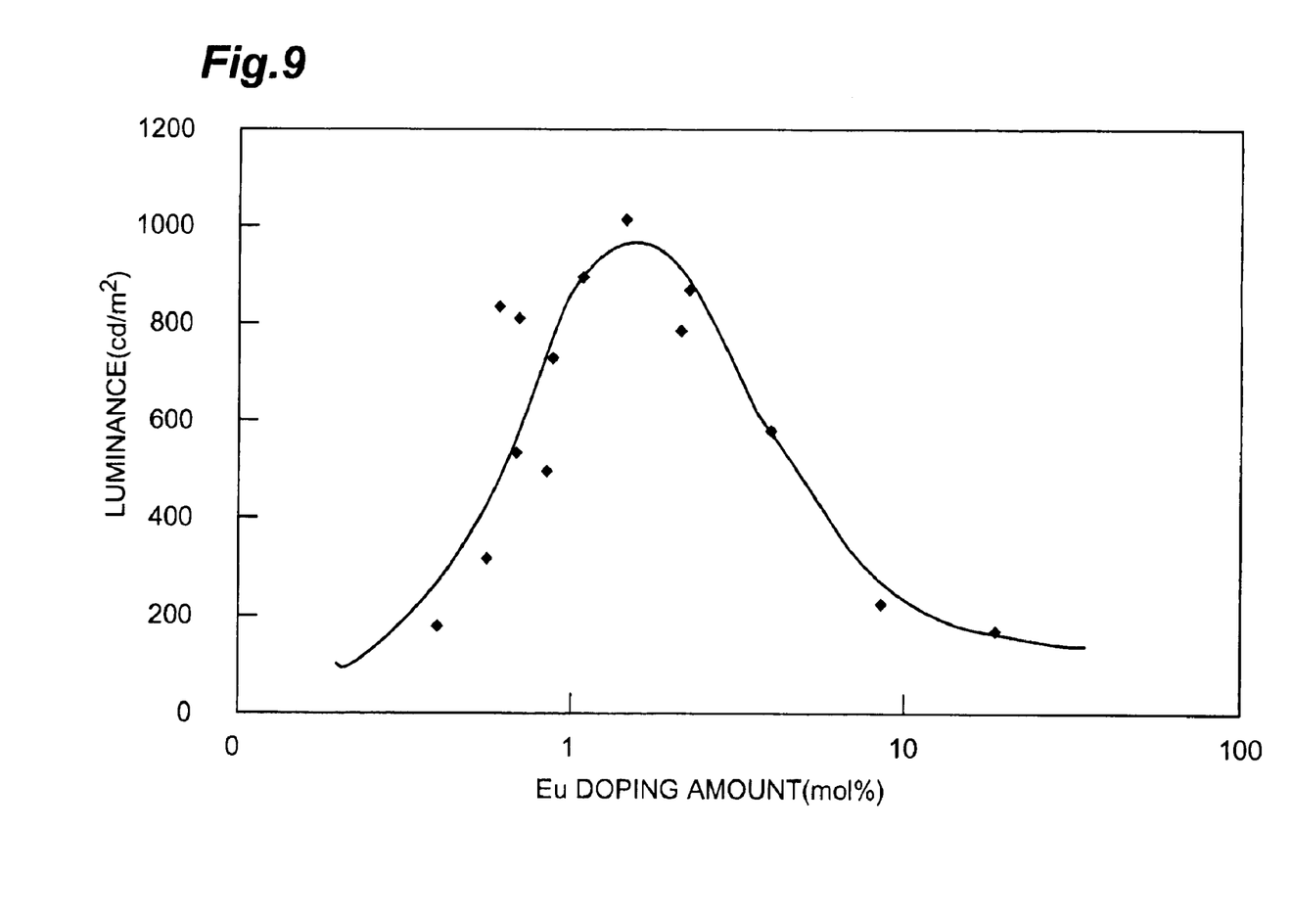
FIG. 9 is a graph showing the relationship between Eu doping amount and luminance in the phosphor thin films of EL devices obtained by Example 3.

Various EL devices obtained by Example 3 were evaluated in terms of luminance. FIG. 8 is a graph showing the relationship between Ga/Mg and luminance in the phosphor thin films of EL devices obtained by Example 3. FIG. 9 is a graph showing the relationship between Eu doping amount and luminance in the phosphor thin films of EL devices obtained by Example 3. The Eu doping amount in FIG. 9 is expressed in terms of mole percent of Eu with respect to Mg+Ga, whereas Ga/Mg is fixed at 1.5 therein. The curves in both of the graphs are reference lines for respective sets of data plot points.

It has been verified that no change in chromaticity is seen within the composition ranges shown in FIGS. 8 and 9, whereby a color purity of (0.66, 0.34) is obtained on a CIE 1931 chromaticity diagram. It has also been found that all the EL devices obtained by Example 3 can achieve a luminance higher than that of the conventional EL device having the phosphor thin film made of CaS:Eu obtained by Comparative Example 1. The superiority of the present invention can be seen from this fact as well.

As explained in the foregoing, the phosphor thin film and EL panel of the present invention can emit highly pure red light, thus requiring no color filter when used as a red-light-emitting device for a multicolor panel or full-color panel. Also, since the phosphor thin film of the present invention yields a high luminance, the EL device including the same can realize red emission with a luminance remarkably higher than that obtained by a combination of a color filter and a conventional phosphor thin film. Further, the phosphor thin film and EL panel of the present invention exhibit a quite favorable response, and thus are suitable as a panel for moving images.

What is claimed is:

1. An EL device comprising:
    a lower buffer thin film, formed on a substrate, containing a sulfide;
    a phosphor thin film, formed on said lower buffer thin film, comprising a matrix material containing an oxide including Mg and Ga, and a luminescent center including at least one kind of element selected from rare-earth elements, Pb, Bi, and Cr and said luminescent center content is from 0.1 to 10 atomic % with respect to a total amount of said matrix material and said luminescent center; and
    an upper buffer thin film, formed on said phosphor thin film, containing a sulfide; and wherein each of said lower and upper buffer thin films having a thickness of from 20 to 300 nm.

2. An EL device according to claim 1, wherein said sulfide contained in said lower and upper buffer thin films is zinc sulfide.

3. An EL device according to claim 1, further comprising an upper electron injection thin film containing at least one of an oxide and a nitride with a thickness of from 5 to 150 nm on a side opposite from a side formed with said phosphor thin film in said upper buffer thin film.

4. An EL device according to claim 3, wherein said oxide contained in said upper electron injection thin film is aluminum oxide.

5. An EL device according to claim 1, further comprising a lower electron injection thin film containing at least one of an oxide and a nitride with a thickness of from 5 to 150 nm between said substrate and said lower buffer thin film.

6. An EL device according to claim 5, wherein said oxide contained in said lower electron injection thin film is aluminum oxide.

* * * * *